United States Patent
Yamamoto

(10) Patent No.: US 10,756,593 B2
(45) Date of Patent: Aug. 25, 2020

(54) DRIVE APPARATUS

(71) Applicant: DENSO CORPORATION, Kariya, Aichi-pref. (JP)

(72) Inventor: Naohiro Yamamoto, Kariya (JP)

(73) Assignee: DENSO CORPORATION, Kariya, Aichi-Pref. (JP)

(*) Notice: Subject to any disclaimer, the term of this patent is extended or adjusted under 35 U.S.C. 154(b) by 78 days.

(21) Appl. No.: 15/882,891

(22) Filed: Jan. 29, 2018

(65) Prior Publication Data
US 2018/0219450 A1    Aug. 2, 2018

(30) Foreign Application Priority Data
Jan. 31, 2017   (JP) .................. 2017-015246

(51) Int. Cl.
H02K 5/22       (2006.01)
H02K 11/215     (2016.01)
H02K 9/22       (2006.01)
H02K 11/33      (2016.01)
B62D 5/04       (2006.01)
H02K 9/00       (2006.01)

(52) U.S. Cl.
CPC .......... H02K 5/225 (2013.01); B62D 5/0406 (2013.01); H02K 9/00 (2013.01); H02K 9/22 (2013.01); H02K 11/215 (2016.01); H02K 11/33 (2016.01)

(58) Field of Classification Search
CPC . H02K 5/22; H02K 11/33; H02K 9/00; H02K 11/215; H02K 9/22; H02K 5/225; B62D 5/04; B62D 5/0406
See application file for complete search history.

(56) References Cited

U.S. PATENT DOCUMENTS

| 9,627,944 B2 * | 4/2017 | Nakano | H02K 29/08 |
| 10,211,709 B2 * | 2/2019 | Asao | B62D 5/0406 |
| 2010/0201213 A1 * | 8/2010 | Kataoka | H02K 3/522 |
| | | | 310/71 |
| 2011/0316365 A1 * | 12/2011 | Kim | H02K 1/18 |
| | | | 310/43 |
| 2012/0286604 A1 * | 11/2012 | Abe | H02K 11/33 |
| | | | 310/71 |

(Continued)

FOREIGN PATENT DOCUMENTS

| JP | 2008-099405 A | 4/2008 | |
| JP | 2016-207963 | 12/2016 | |
| WO | WO-2013098001 A2 * | 7/2013 | ............. H02K 11/33 |

Primary Examiner — Naishadh N Desai
(74) Attorney, Agent, or Firm — Maschoff Brennan

(57) ABSTRACT

A drive apparatus is provided which includes a motor and a control unit. The control unit has a heat sink secured to a cover. The motor is equipped with leads extending toward the control unit through a housing. The control unit has a substrate which is equipped with connectors detachably joined to the leads, thereby eliminating soldering or welding to achieve an electrical connection of the motor and the control unit. Such a connection is accomplished by inserting the leads into the connectors, thus eliminating the need for a special and large-sized equipment and resulting in a decrease in production cost of the drive apparatus. The non-destructive disassembling of the motor and the control unit is achieved by disengaging them from each other to remove the second terminal from the first terminal.

17 Claims, 15 Drawing Sheets

(56) References Cited

U.S. PATENT DOCUMENTS

| | | | |
|---|---|---|---|
| 2012/0286605 A1* | 11/2012 | Miyachi | B62D 5/0406 |
| | | | 310/71 |
| 2014/0028129 A1* | 1/2014 | Jo | H02K 5/225 |
| | | | 310/71 |
| 2014/0091683 A1* | 4/2014 | Ito | B62D 5/0406 |
| | | | 310/68 R |
| 2014/0265749 A1 | 9/2014 | Motoda et al. | |
| 2014/0339966 A1* | 11/2014 | Tomizawa | H02K 5/22 |
| | | | 310/68 D |
| 2015/0102692 A1* | 4/2015 | Bae | H02K 5/225 |
| | | | 310/71 |
| 2015/0155763 A1 | 6/2015 | Hiramine et al. | |
| 2016/0181884 A1* | 6/2016 | Rumbaugh | H01R 13/523 |
| | | | 310/71 |
| 2016/0181885 A1* | 6/2016 | Yamasaki | H02K 11/33 |
| | | | 180/443 |
| 2016/0204670 A1* | 7/2016 | Yamasaki | H02K 11/215 |
| | | | 310/71 |
| 2017/0005539 A1 | 1/2017 | Yamasaki | |

\* cited by examiner

DRIVE APPARATUS

CROSS REFERENCE TO RELATED DOCUMENT

The present application claims the benefit of priority of Japanese Patent Application No. 2017-15246 filed on Jan. 31, 2017 the disclosure of which is incorporated herein by reference.

BACKGROUND

1 Technical Field

The invention relates generally to a drive apparatus for use in an electrical power steering system which electrically assists a steering operation of a driver of vehicles such as automobiles.

2 Background Art

Drive apparatuses are shown which are equipped with an electrical motor and a control unit working to control an operation of the motor. Japanese Patent First Publication No. 2017-017866 teaches such a type of drive apparatus designed to achieve an electrical connection between the motor and the control unit using electrical leads which extend from the motor to the control unit through a motor housing. The electrical leads are soldered to conductive portions on a substrate of the control unit.

Production of the drive apparatus in which the electrical leads are soldered or welded to the substrate requires special and large-sized equipment. Once assembled, the drive apparatus is difficult to disassemble in a non-destructive manner. If, therefore, some fault of the drive apparatus is found after the drive apparatus is assembled, it needs to dispose the whole of the drive apparatus.

SUMMARY

It is, therefore, an object of this disclosure to provide a drive apparatus which does not require special and large-sized production equipment and has an electrical motor and a control unit which are permitted to be disassembled in a non-destructive way.

According to one aspect of this disclosure, there is provided a drive apparatus for use in an electrical power steering system which electrically assists a steering operation of a driver of a vehicle. The drive apparatus comprises: (a) a motor which includes a housing, a stator secured to the housing, and a rotor which is rotatable relative to the stator; and (b) a control unit which includes a cover, a heat sink secured to the cover, a substrate secured to the heat sink, and an electronic device mounted on the substrate and works to control energization of a coil of the stator.

The coil has a first terminal which extends toward the control unit through the housing.

The substrate is equipped with a second terminal which is detachably connected to the first terminal.

The above structure eliminates the need for soldering or welding to achieve an electrical connection of the motor and the control unit. Specifically, the electrical connection is accomplished by inserting the first terminal into the second terminal, thus eliminating the need for a special and large-sized equipment and resulting in a decrease in production cost of the drive apparatus.

The non-destructive disassembling of the motor and the control unit is achieved by disengaging them from each other to remove the second terminal from the first terminal. Therefore, if a defect in the drive apparatus is found after assembled, only one of the motor and the control unit which has the defect can be replaced with a new one without having to discard the whole of the drive apparatus.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

In the following discussion of embodiments, like reference numbers refer to like parts throughout several views, and explanation thereof in detail will be omitted here.

First Embodiment

Figure 1:
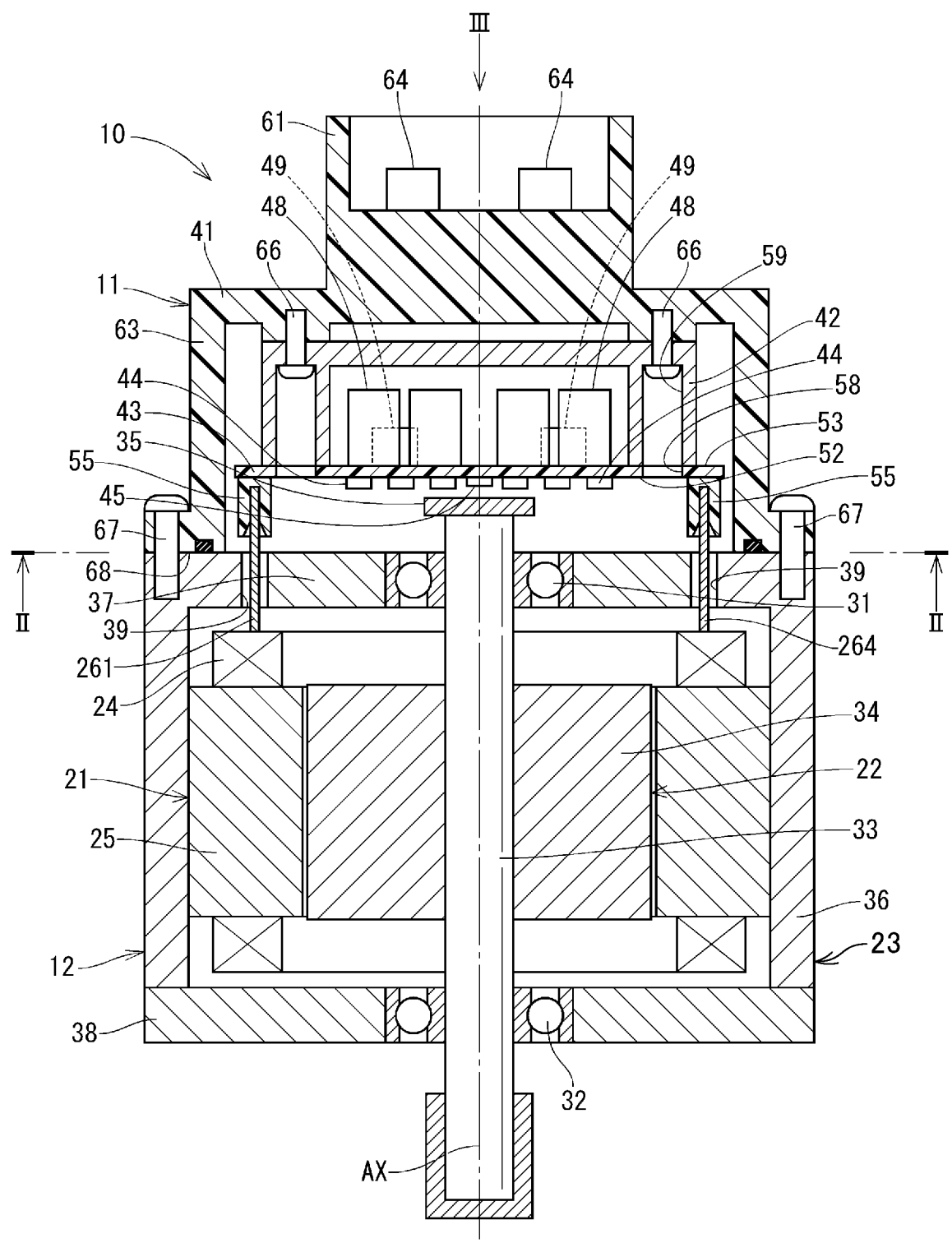
FIG. 1 is a sectional view of a drive apparatus according to the first embodiment.

FIG. 1 illustrates the drive apparatus 10 according to the first embodiment. The drive apparatus 10 is used as a drive source for an electrical power steering system working to assist a steering operation of a drive of a vehicle.

The overall structure of the drive apparatus 10 will be described below with reference to FIGS. 1 and 2.

The drive apparatus 10 is designed as a motor-integrated driver which has the electrical the motor 12 and the control unit 11 disposed therein.

Figure 2:
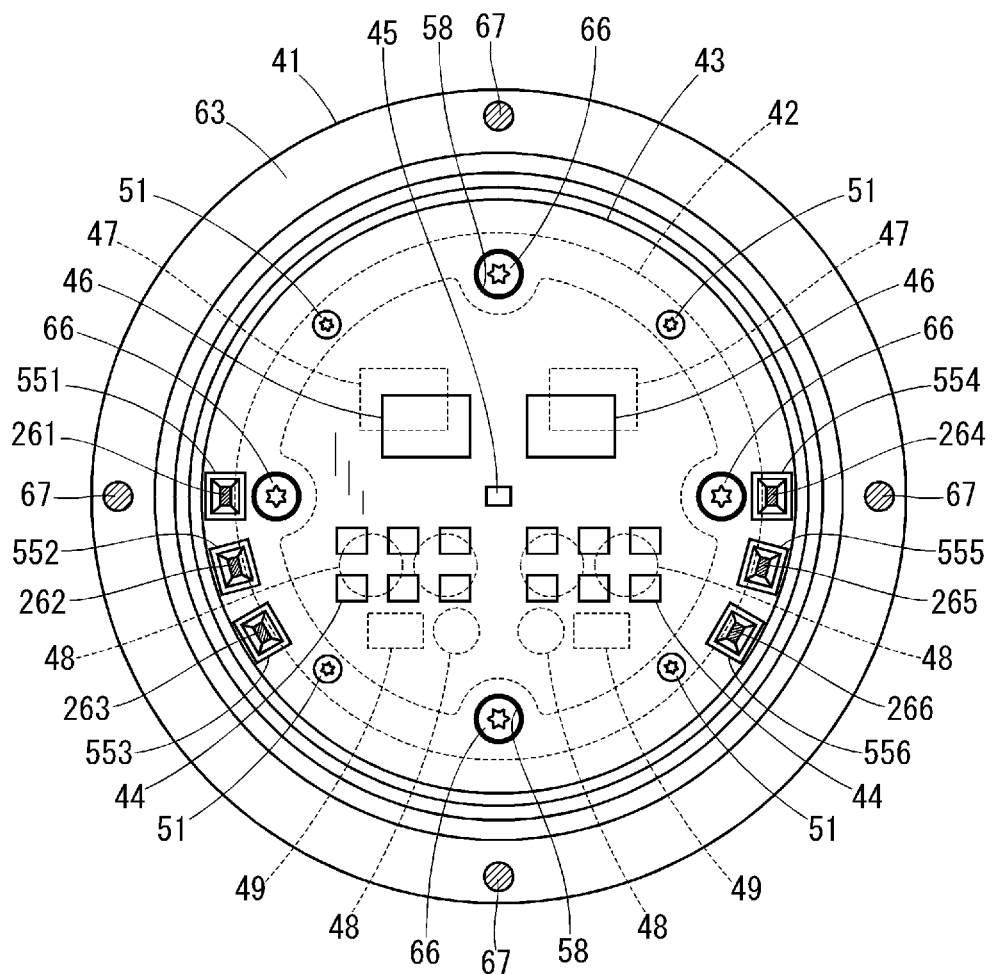
FIG. 2 is a sectional view, as taken along the line II-II in FIG. 1.

The motor 12 is, as clearly illustrated in FIGS. 1 and 2, implemented by a three-phase brushless motor and includes the stator 21, the rotor 22, and the housing 23 in which the stator 21 and the rotor 22 are disposed.

The stator 21 is equipped with the stator core 24 secured to the housing 23, and two three-phase coils 25 arranged on the stator core 24. Three phase windings of one of the coils 25 have electrical lead 261, 262, and 263 extending therefrom, respectively. Similarly, three phase windings of the other coil 25 have electrical leads 264, 265, and 266 extending therefrom, respectively. In the following discussion, the leads 261, 262, 263, 264, 265, and 266 will generally be referred to below as leads 26.

The rotor 22 includes the rotating shaft 33 retained by the bearings 31 and 32 and the rotor core 34 fit on the rotating shaft 33. The rotor 22 is arranged inside the stator 21 to be rotatable relative to the stator 21. The rotating shaft 33 has disposed on an end thereof the sensed member 35 made of a permanent magnet. The sensed member 35 is used by the angular position sensor 45 (also called a rotation angle sensor), which will be described later in detail, to measure an angular position (i.e., an angle of rotation) of the rotor 22.

The housing 23 includes the bottomed hollow cylindrical case 36 with the first frame end 37. The housing 23 also has the second frame end 38 secured to an end of the case 36. The case 36 and the second frame end 38 are joined together using, for example, bolts not shown. The leads 26 extend through the lead-passing holes 39 of the first frame end 37 toward the control unit 11.

The control unit 11 is equipped with the cover 41, the heat sink 42 secured to the cover 41, the substrate 43 (i.e., a base plate) attached to the heat sink 42, and electronic devices 44 to 49 mounted on the substrate 43. The cover 41 serves to protect the electronic devices 44 to 49 from external physical impact and avoid entrance of dust or water into the control unit.

The substrate 43 is a printed circuit board which is located to face the first frame end 37 and secured to the heat sink 42 using screws 51. The substrate 43 has two opposed major surfaces: the first major surface 52 facing the first frame end 37 and the second major surface 53 facing the heat sink 42.

On the first major surface 52 of the substrate 43, a plurality of switching devices 44, the angular position sensor 45, the integrated circuit 46, and the microcomputer 47 are mounted. The switching devices 44 constitute inverters, one for each of the coils 25. The angular position sensor 45 measures the angular position of the rotor 22. The integrated circuit 46 outputs drive signals to the switching devices 44. The microcomputer 47 calculates a command value for electric power delivered to each phase winding of the coils 25 as a function of the angular position of the rotor 22. The angular position sensor 45 faces the sensed member 35.

On the second major surface 53 of the substrate 43, the capacitors 48 and the coils 49 are mounted. The capacitors 48 work to store electrical charge to assist in supplying electric power to the coils 25. The coils 49 constitute filter circuits along with the capacitors 48.

The substrate 43 is electrically connected to the leads 26. Such connections will be described later in detail.

In operation, the drive apparatus 10 works to sequentially switch energization from one to another of the phase windings of the coils 25 using an output from the angular position sensor 45, thereby producing a rotating magnetic field to rotate the rotor 22. The drive apparatus 10 has a first and a second end opposed to each other in an axial or lengthwise direction thereof. The motor 12 is located on the first end, while the control unit 11 is located on the second end. The control unit 11 is, therefore, not subjected directly to mechanical vibration produced by the motor 12.

Next, structural features of the drive apparatus 10 will be described below with reference to FIGS. 1 to 5. In the following discussion, a direction parallel to an axis AX of rotation of the motor 12 will be referred to as an axial direction. A direction perpendicular to the axis AX will be referred to as a radial direction. A direction around the axis AX will be referred to as a circumferential direction.

Connection Between Motor and Control Unit

The coils 25, as clearly illustrated in FIGS. 1 and 2, have the leads 16 working as first terminals. The leads 26 extend through the lead-passing holes 39 of the first frame end 37 toward the control unit 11. The substrate 43 is equipped with connectors 551 to 556 working as second terminals. The connectors 551 to 556 are detachably joined to the leads 261 to 266, respectively. A direction in which the leads 261 to 266 are joined to or removed from the connectors 551 to 556 is the axial direction. The motor 12 and the control unit 11 are electrically connected together using the leads 261 to 266 and the connectors 551 to 556. In the following discussion, the connectors 551 to 556 will generally be referred to as connectors 55.

The leads 26 are, as illustrated in FIGS. 1, 2, 4, and 5, designed as male terminals. The connectors 55 are designed as female terminals. Each of the connectors 55, as clearly illustrated in FIG. 5, has formed therein a cylindrical receptacle hole made up of a socket portion 56 and a guide portion 57 located closer to an opening of the receptacle hole than the socket portion 56 is. The guide portion 57 is of a frusto-conical shape and has an inner diameter which increases as approaching the opening of the connector 55. The guide portion 57 works to guide the end of the lead 26 to the socket portion 56 when the lead 26 is inserted into the connector 55. The guide portion 57 serves to permit the end of the lead 26 to slightly move in the receptacle hole of the connector 55 in the radial and circumferential directions when the motor 12 and the control unit 11 are joined together.

Securement Between Motor and Control Unit

Figure 3:
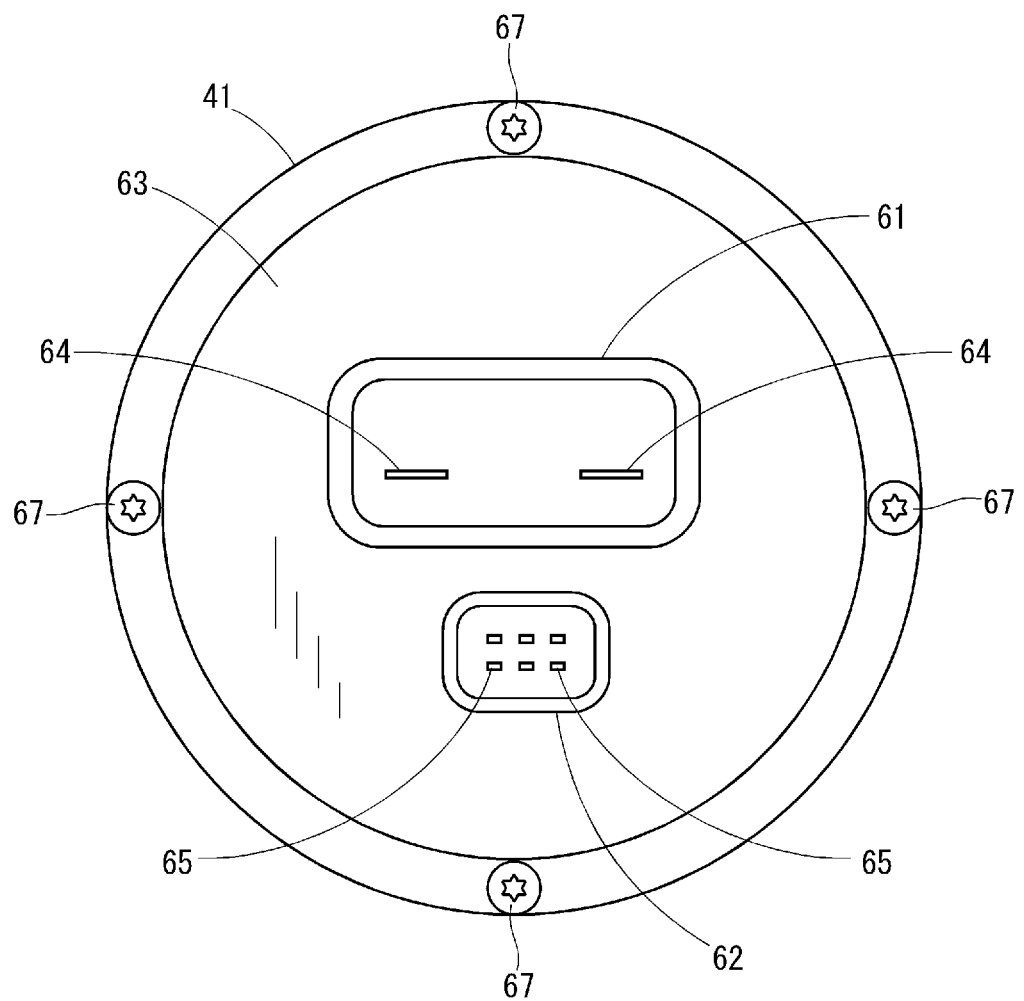
FIG. 3 is an illustration of the drive apparatus of FIG. 1, as viewed from an arrow III in FIG. 1.
Figure 4:
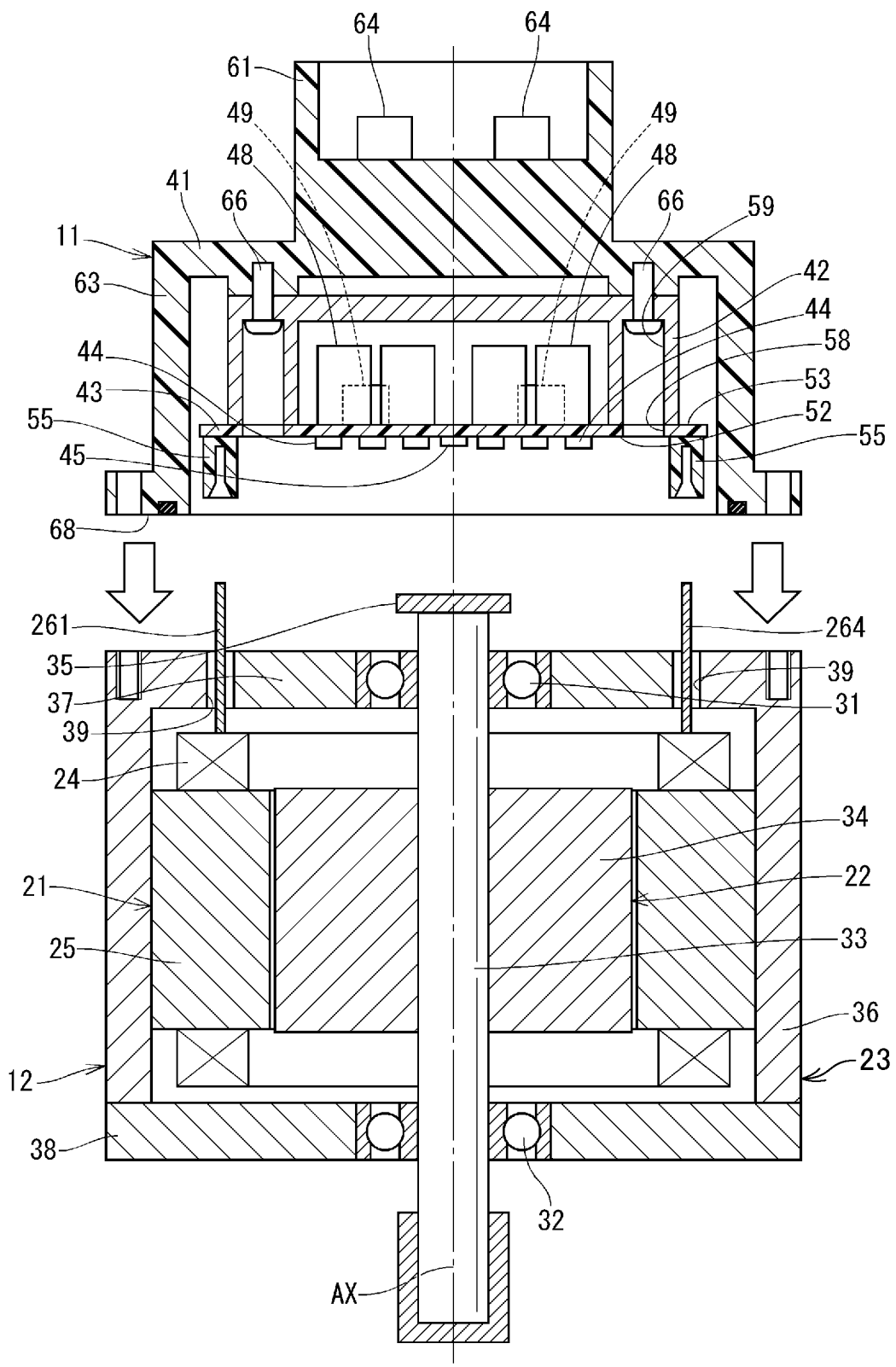
FIG. 4 is a sectional view which illustrates a fabrication process to join a motor and a control unit together when the drive apparatus of FIG. 1 is fabricated.
Figure 5:
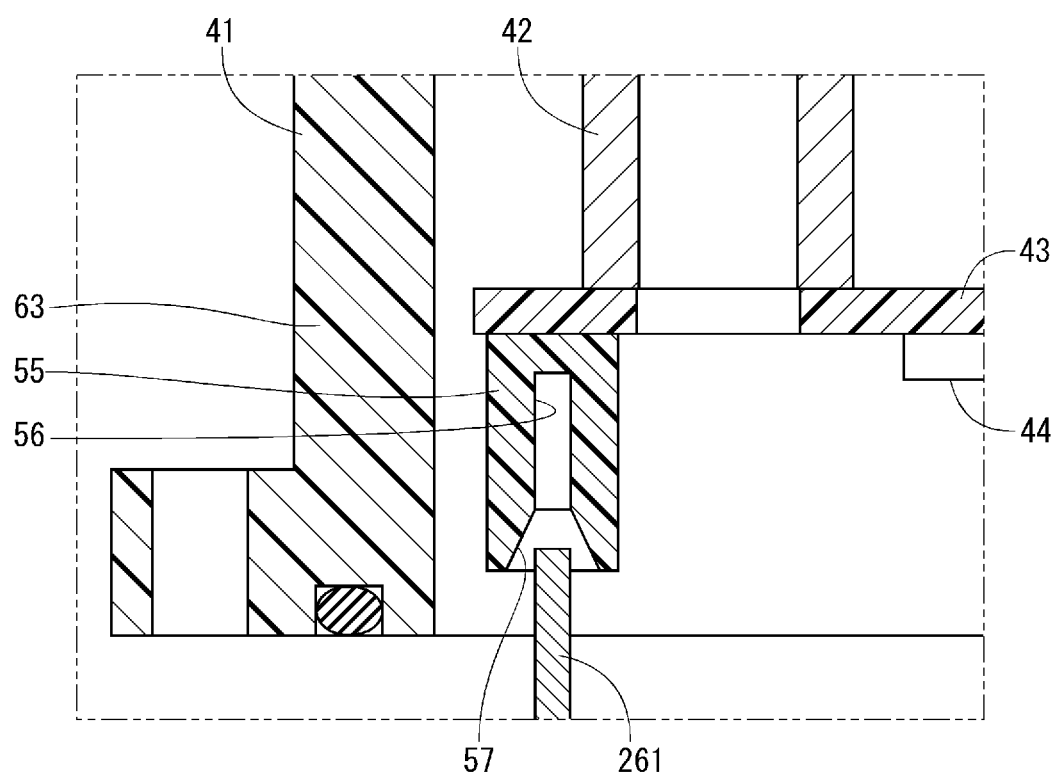
FIG. 5 is an enlarged view which illustrates a region around connectors of a control unit into which leads of a motor have started to be inserted following the fabrication process of FIG. 4.

The cover 41 is, as illustrated in FIGS. 1 to 3, equipped with external connectors 61 and 62 and the covering portion 63. The external connectors 61 and 62 achieve an electrical connection of the control unit 11 with an external device(s). The covering portion 63 is made of the same material as those of the external connectors 61 and 62. The external connector 61 has power feeding terminals 64 which are connected to the substrate 43 through paths, not shown. The external connector 62 has signal terminals 65 connected to the substrate 43 through paths, not shown.

The covering portion 63 is formed in the shape of a cup. The substrate 43, the electronic devices 44 to 49, and the heat sink 42 are all disposed inside the covering portion 63 of the cover 41. In other words, the substrate 43, the electronic devices 44 to 49, and the heat sink 42 are not arranged outside the opening of the covering portion 63 toward the motor 12. The heat sink 42 is firmly attached to the cover 41 using screws 66 inserted into the counterbore 59 through the hole 58 formed in the substrate 43. The covering portion 63 has an open end placed in contact with the first frame end 37 and firmly joined to the first frame end 37 using screws 67.

A portion of the control unit 11 firmly secured to the first frame end 37 of the housing 23 is only the cover 41. Specifically, the control unit 11 is firmly joined to the motor 12 only on the fitting surface 68. The fitting surface 68 is an end surface of the cover 41 (i.e., the surface of the open end of the covering portion 63) fit on the first frame end 37.

The assembling of the drive apparatus 10 mainly includes the following two steps. The cover 41, the heat sink 42, the substrate 43, and the electronic devices 44 to 49 are assembled together in a sub-fabrication line to make the control unit 11.

First Step

The motor 12 is fabricated.

Second Step

The cover 41 of the control unit 11 is secured to the first frame end 37 of the housing 23 of the motor 12.

Beneficial Effects

In the first embodiment, the heat sink 42 of the control unit 11 is, as described above, secured to the cover 41. The coils 25 of the motor 12 have the leads 26 (i.e., the first terminals) extending through the housing 23 toward the control unit 11. The substrate 43 is equipped with the connectors 55 (i.e., the second terminals) which are detachably joined to the leads 26.

In the thus constructed drive apparatus 10, the electrical connection between the motor 12 and the control unit 11 is achieved without use of soldering or welding techniques. Specifically, such connection is accomplished by plugging the leads 26 into the connectors 55, thus eliminating the need for a special and large-sized equipment and resulting in a decrease in production cost of the drive apparatus 10.

The non-destructive disassembling of the motor 12 and the control unit 11 is achieved by disengaging them from each other to remove the connectors 55 from the leads 26. Therefore, if a defect in the drive apparatus 10 is found after assembled, only one of the motor 12 and the control unit 11 which has the defect can be replaced with a new one without having to discard the whole of the drive apparatus 10.

In the first embodiment, the first terminals are designed as male terminals. The second terminals are designed as female terminals. This enables an electrical connection between the motor 12 and the control unit 11 to be made only by extending ends of the coils 25 toward the control unit 11 and also minimizes a risk that the second terminals are broken when the control unit 11 that is made as an assembly in a sub-fabrication line is carried.

Each of the connectors 55 is equipped with the guide portion 57 which guides the insertion of the lead 26 into the connector 55. The guide portion 57 serves to allow the top end of the lead 26 and the opening of the connector 55 to be misaligned with each other in the radial or circumferential direction when the motor 12 and the control unit 11 are assembled.

The control unit 11 is designed to be secured to the housing 23 only at the cover 41.

When the thus constructed drive apparatus 10 is produced, the motor 12 is first fabricated. Next, the cover 41 which is assembled with the substrate 43 on which the electronic devices are mounted and the heat sink 42 in the sub-fabrication line is secured to the housing 23 of the motor 12. Accordingly, the drive apparatus 10 is produced in two main fabrication processes, thus resulting in a decrease in fabrication processes by one as compared with a conventional structure in which a heat sink to which a substrate on which electronic devices are mounted is secured or a substrate and electronic devices are attached respectively.

The cover 41 is equipped with the external connectors 61 and 62 for connecting the control unit 11 to an external device and the covering portion 63 which is made of the same material as that of the external connectors 61 and 62. In other words, the external connectors 61 and the covering portion 63 are made of a one-piece member. This results in a decrease in number of parts or production processes of the drive apparatus 10 as compared with a conventional structure in which external connectors and a cover are made of different materials or discrete members.

The cover 41 is designed in the form of a cup attached to the housing 23. The substrate 43, the electronic devices 44 to 49, and the heat sink 42 are all disposed inside the covering portion 63 of the cover 41. This minimizes a risk that the substrate 43, the electronic devices 44 to 49, and the heat sink 42 are physically broken when the control unit 11 that is made as an assembly in the sub-fabrication process is carried.

Second Embodiment

Figure 6:
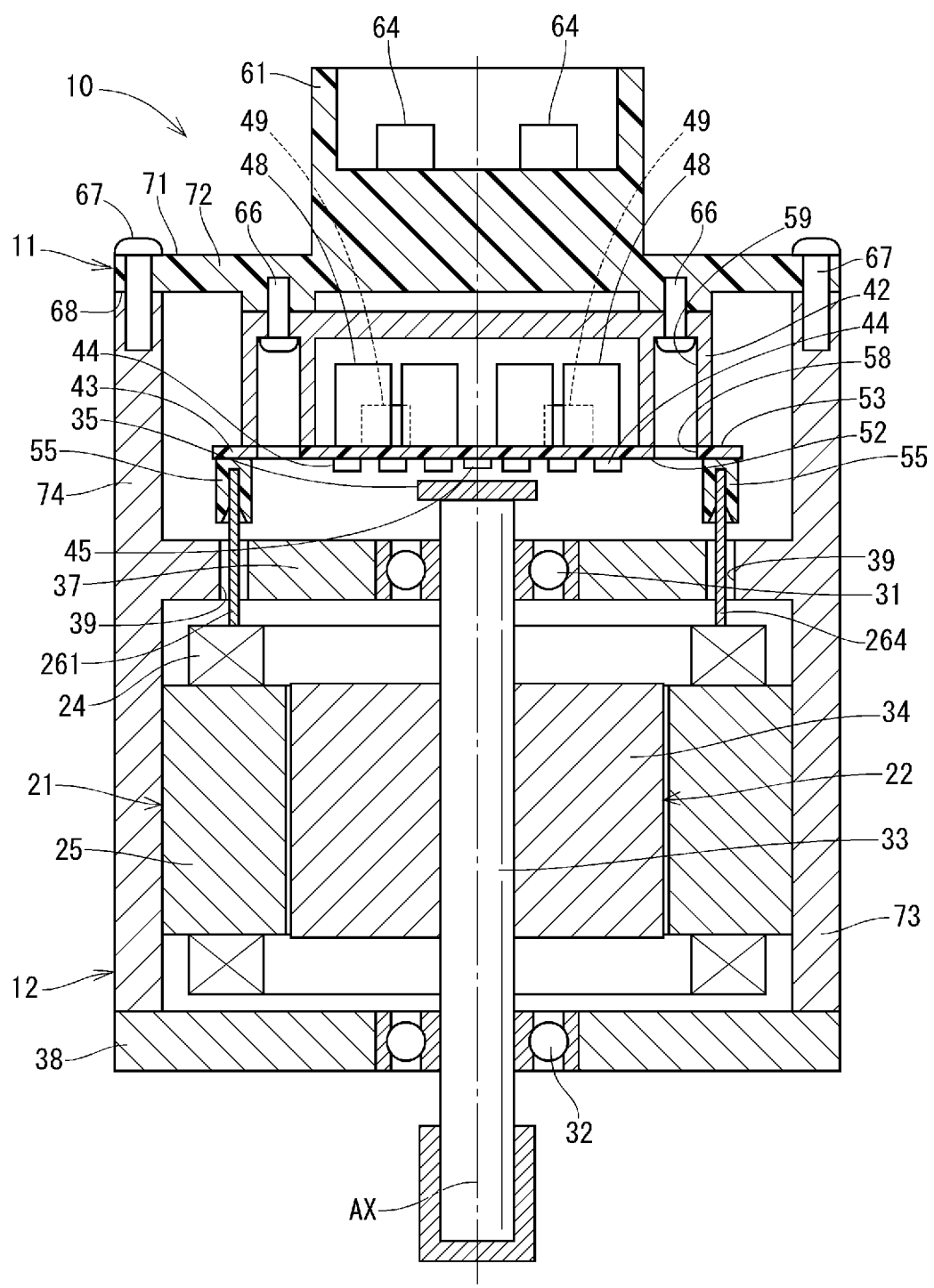
FIG. 6 is a sectional view of a drive apparatus according to the second embodiment.

FIG. 6 illustrates the drive apparatus 10 according to the second embodiment.

The drive apparatus 10 includes the cover 71 equipped with the external connectors 61 and 62, and the covering portion 72. The covering portion 72 is not formed in a cup shape, but in a circular disc shape. The motor 12 is equipped with the housing 73 which includes the hollow cylindrical extension 74 which protrudes from the first frame end 37 toward the control unit 11. The covering portion 72 is secured to the cylindrical extension 74 using screws 67.

Third Embodiment

Figure 7:
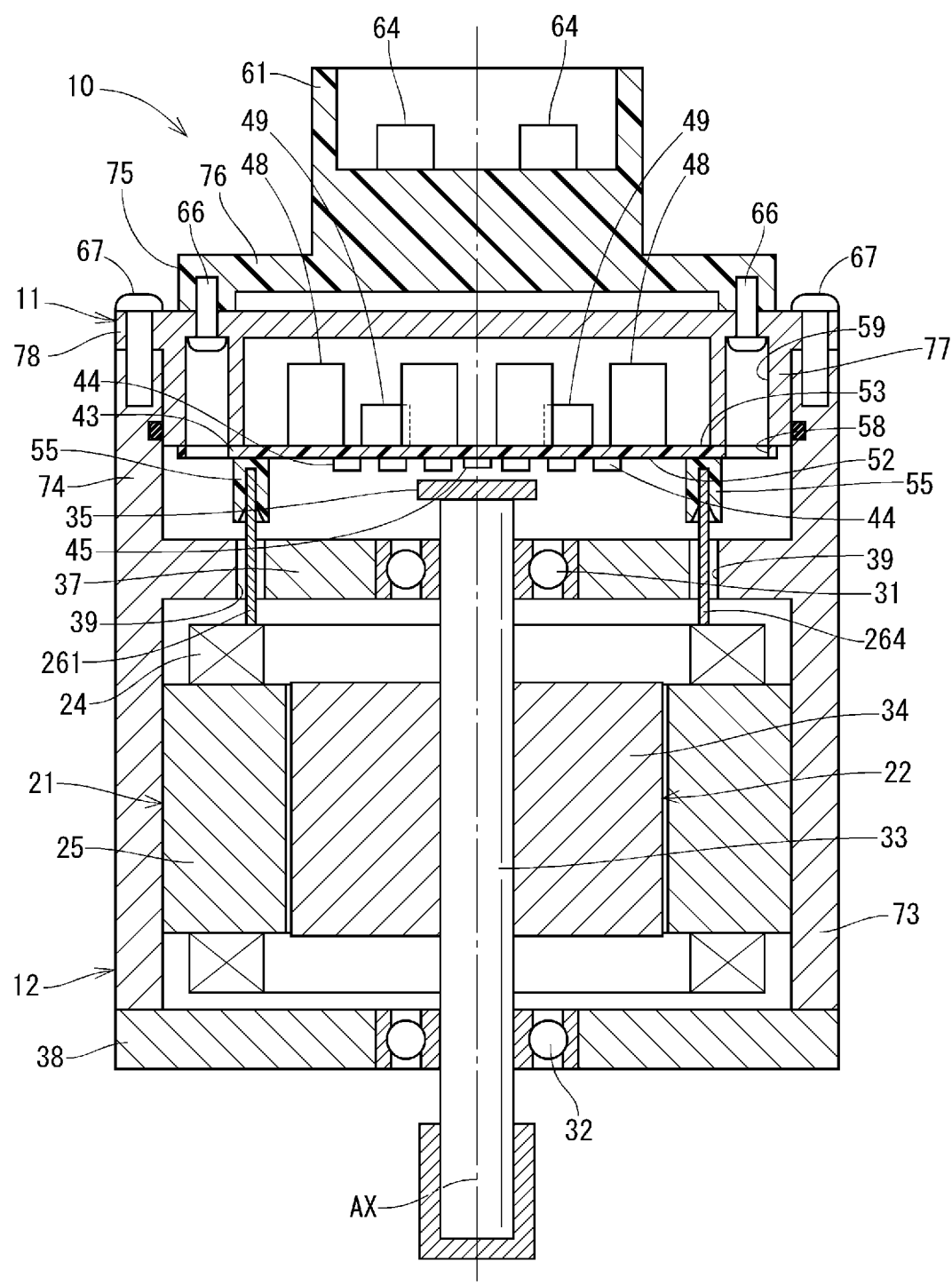
FIG. 7 is a sectional view of a drive apparatus according to the third embodiment.

FIG. 7 illustrates the drive apparatus 10 according to the third embodiment.

The drive apparatus 10 is equipped with the cover 75 which has the covering portion 76. The covering portion 76 is not formed in a cup shape, but in a circular disc shape. The heat sink 77 is fit in the cylindrical extension 74 and has the flange 78 extending in the radial direction. The heat sink 77 is attached to the covering portion 76 using the screws 66 and also secured to the cylindrical extension 74 using the screws 67.

As apparent from the above discussion, the control unit 11, unlike the above embodiments, has the heat sink 77 fixed on the housing 73. This also achieves a mechanical joint of the cover 75 of the control unit 11 to the housing 73.

The heat sink 77 is die-casted with aluminum and has a precise shape. This results in increased accuracy in positioning the control unit 11 and the motor 12 and also facilitates dissipation of heat generated by the control unit 11.

Fourth Embodiment

Figure 8:
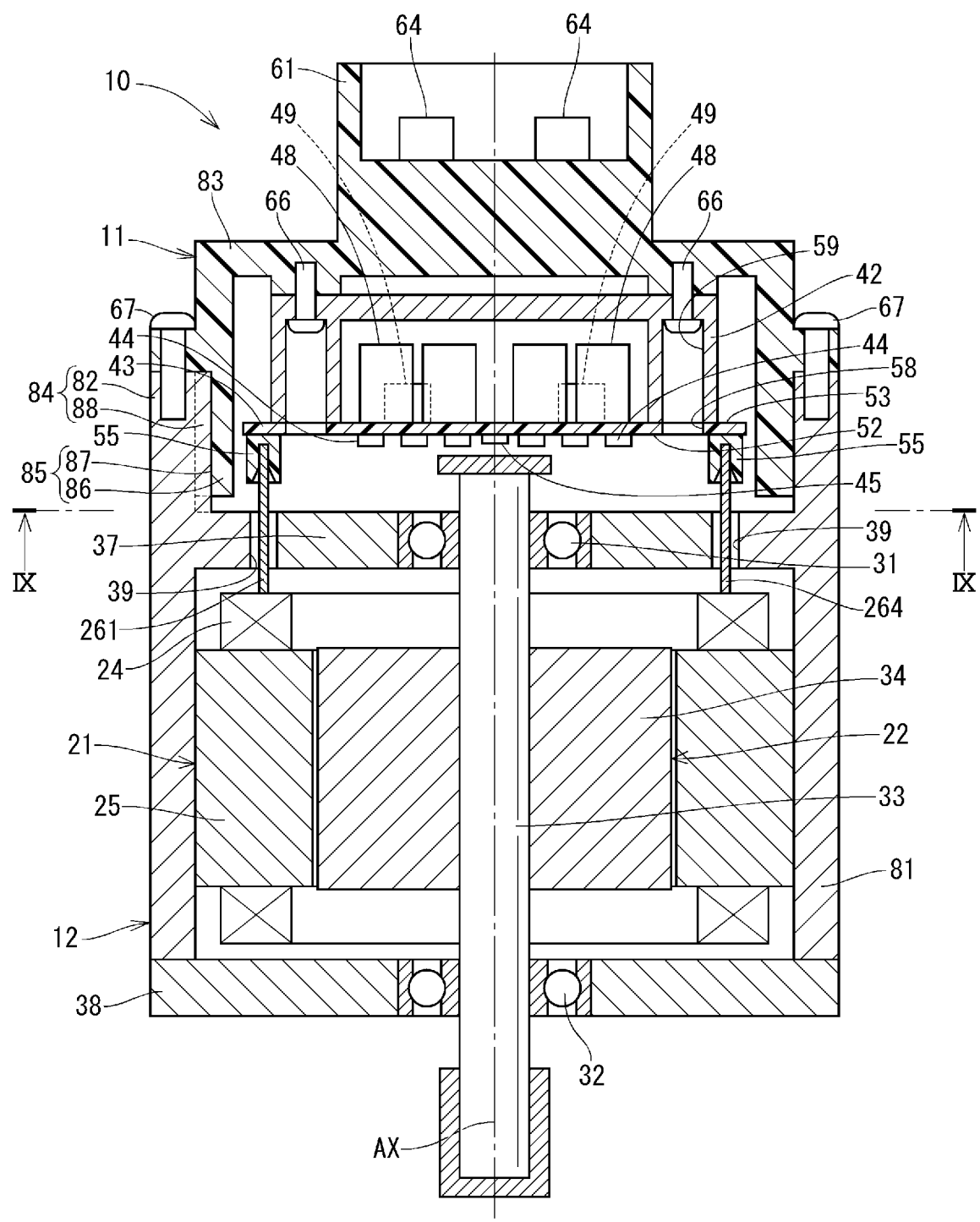
FIG. 8 is a sectional view of a drive apparatus according to the fourth embodiment.
Figure 9:
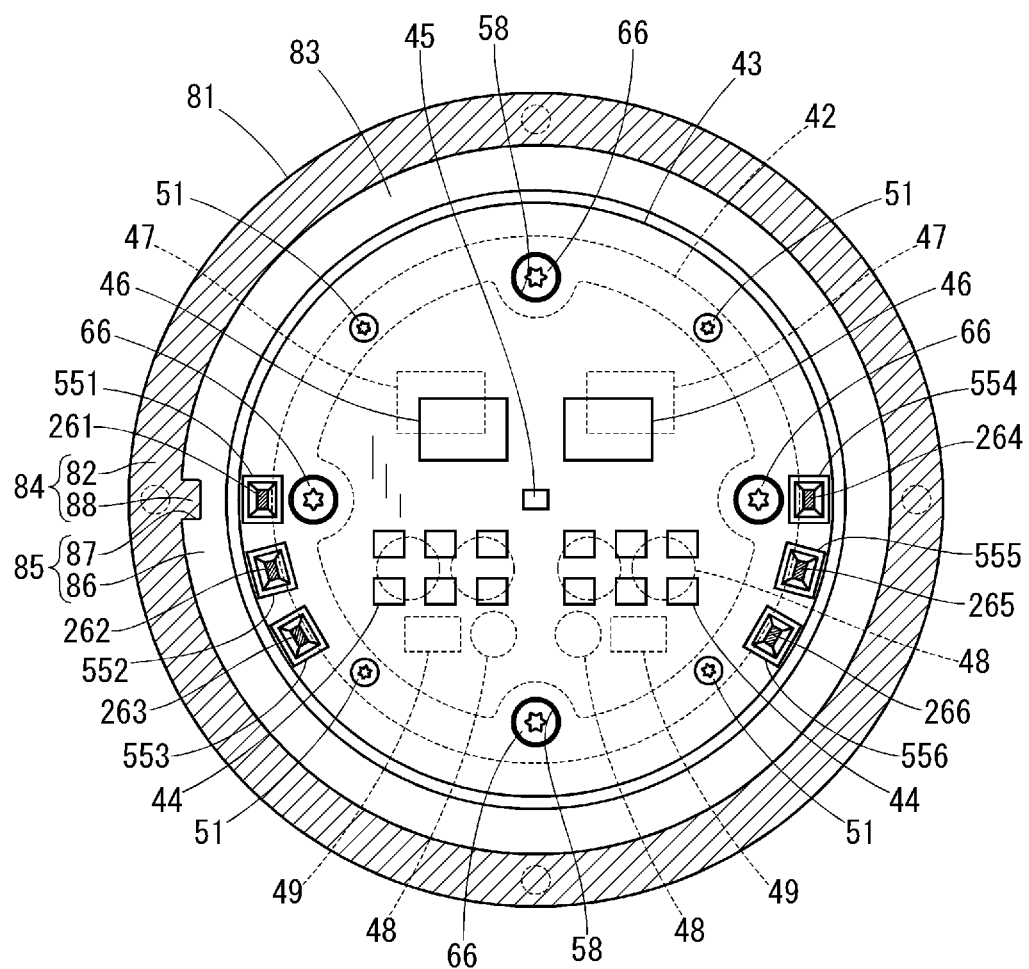
FIG. 9 is an illustration of the drive apparatus of FIG. 8, as viewed from an arrow IX-IX in FIG. 8.
Figure 10:
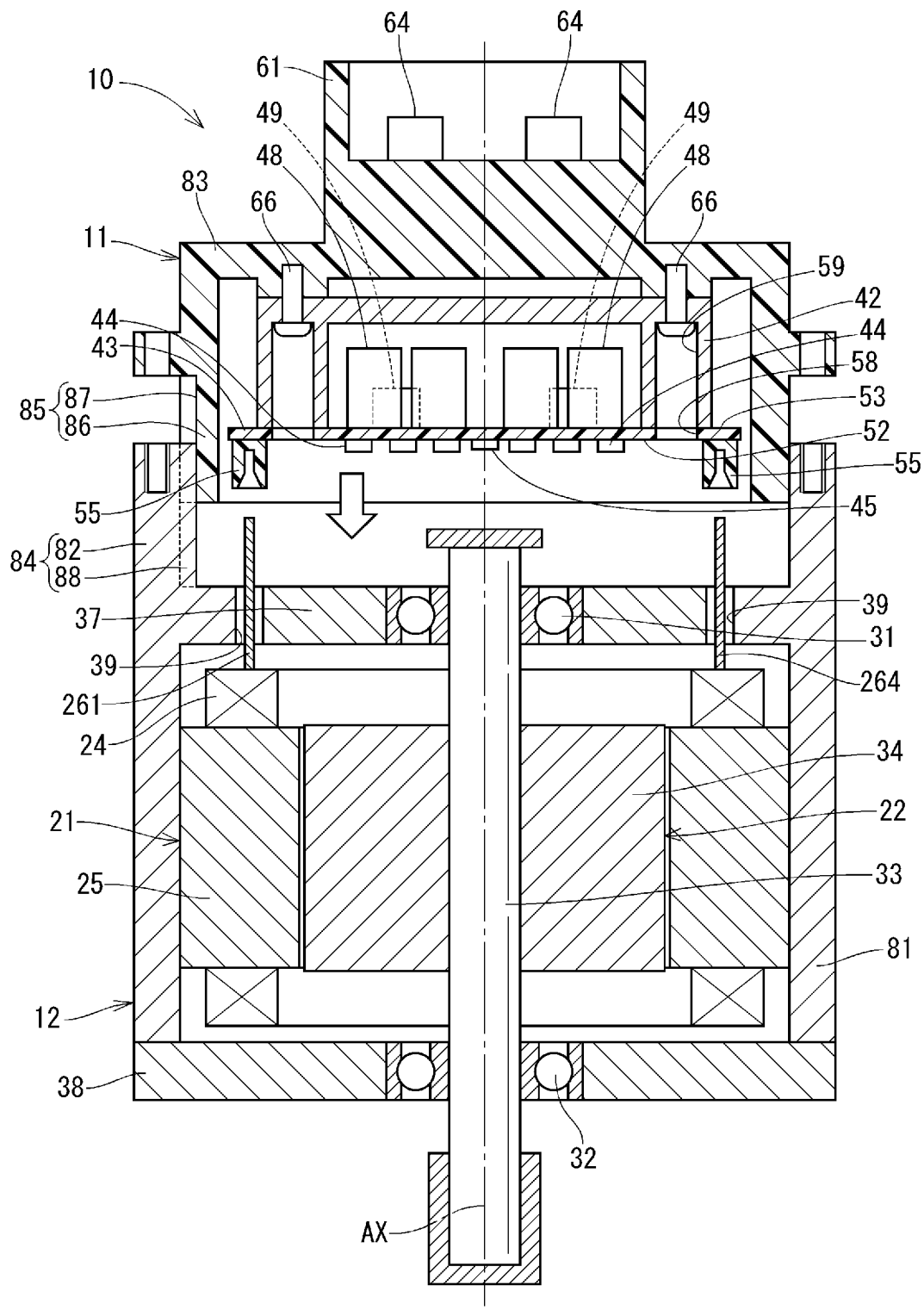
FIG. 10 is a sectional view which illustrates a fabrication process to join a motor and a control unit together when the drive apparatus of FIG. 8 is fabricated.

FIGS. 8 to 10 illustrate the drive apparatus 10 according to the fourth embodiment.

The drive apparatus 10 is equipped with the housing 81 which includes the hollow cylindrical extension 82 protruding from the first frame end 37 toward the control unit 11. The cover 83 has the fitting portion 85 fit in the catching portion 84 of the hollow cylindrical extension 82 of the housing 81. The fit of the fitting portion 85 in the catching portion 84 serves to achieve positioning of the connectors 55 relative to the leads 26 in the radial and circumferential directions.

Specifically, the fitting portion 85, as clearly illustrated in FIG. 9, has a cylindrical portion of the covering portion 86 and the groove 87 formed in an outer wall of a cylindrical portion of the covering portion 86. The cylindrical portion of the covering portion 86 serves to position the connectors 55 relative to the leads 26 in the radial direction. The groove 87 serves to position the connectors 55 relative to the leads 26 in the circumferential direction. The catching portion 84 includes the cylindrical extension 82 which is fit in the cylindrical portion of the covering portion 86 and the protrusion 88 which is formed on an inner wall of the cylindrical extension 82 and fit in the groove 87 of the fitting portion 85.

Accordingly, even when it is impossible to visually perceive insertion of the leads 26 into the connectors 55 on joining of the motor 12 and the control unit 11, engagement of the fitting portion 85 and the catching portion 84 ensures the stability in inserting the leads 26 into the connectors 55.

The distance by which the fitting portion 85 is fit in or engages the catching portion 84 in the axial direction is set longer than the distance by which the leads 26 are inserted into the connectors 55 in the axial direction. This causes, as clearly demonstrated in FIG. 10, the fitting portion 85 to begin to be fitted in the catching portion 84 before the leads 26 are inserted into the connectors 55, in other words, when the heads 26 are still separate from the connectors 55 in the axial direction, thereby positioning the connectors 55 relative to the leads 26 in the radial and circumferential directions before the leads 26 are inserted into the connectors 55 and ensures the stability in joining of the leads 26 to the connectors 55.

Fifth Embodiment

Figure 11:
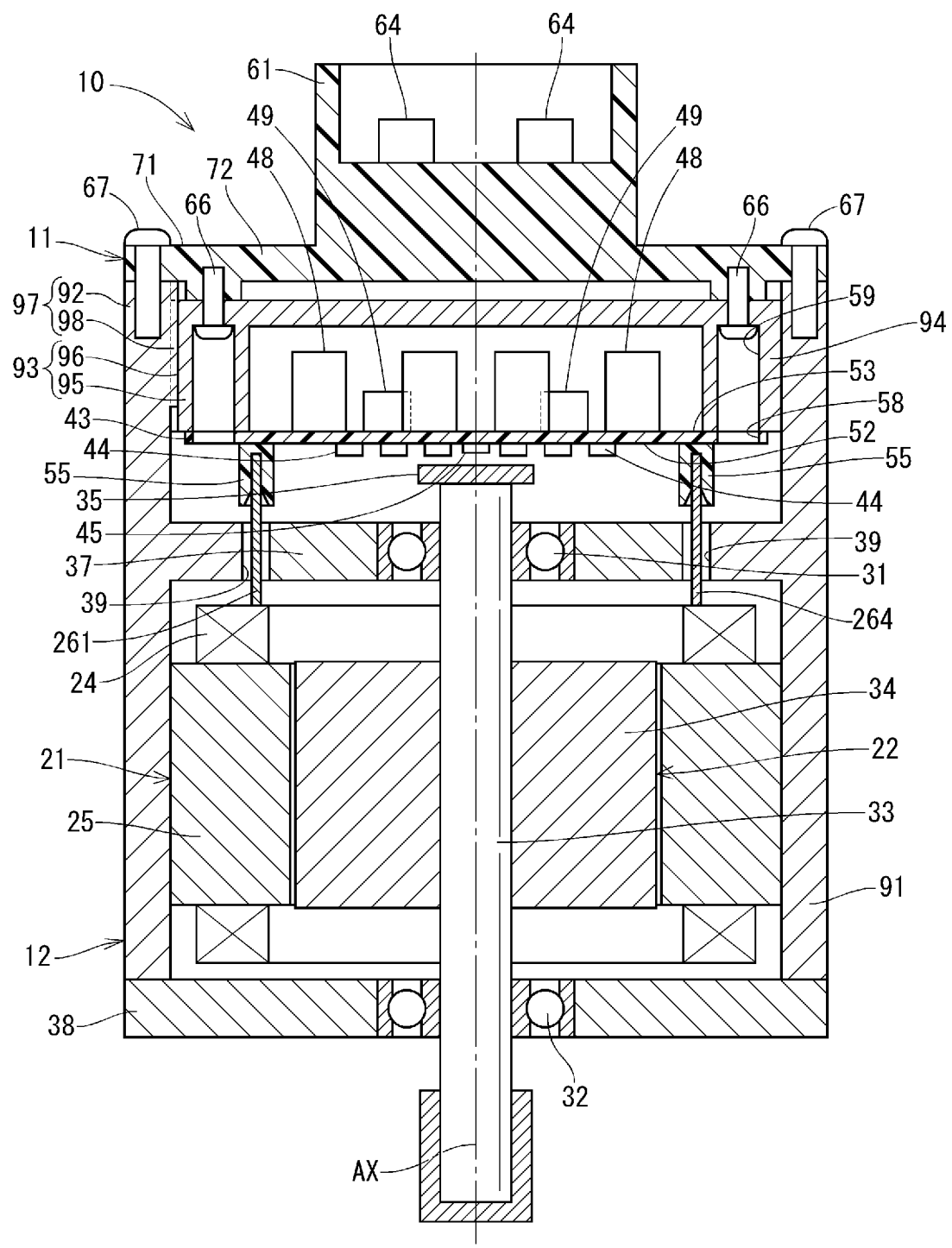
FIG. 11 is a sectional view of a drive apparatus according to the fifth embodiment.

FIG. 11 illustrates the drive apparatus 10 according to the fifth embodiment.

The drive apparatus 10 includes the housing 91 which has the hollow cylindrical extension 92 protruding from the first frame end 37 toward the control unit 11. The drive apparatus 10 also includes the heat sink 94. The heat sink 94 has the fitting portion 93 which is made up of the outer wall 95 fit in the cylindrical extension 92 and the groove 96 formed in the outer wall 95. The drive apparatus 10 also includes the catching portion 97 which is made up of the hollow cylindrical extension 92 and the protrusion 98 formed on an inner wall of the cylindrical extension 92. The protrusion 98 is fit in the groove 96. The engagement of the fitting portion 93 and the catching portion 97 ensures the stability in inserting the leads 26 into the connectors 55.

Sixth Embodiment

Figure 12:
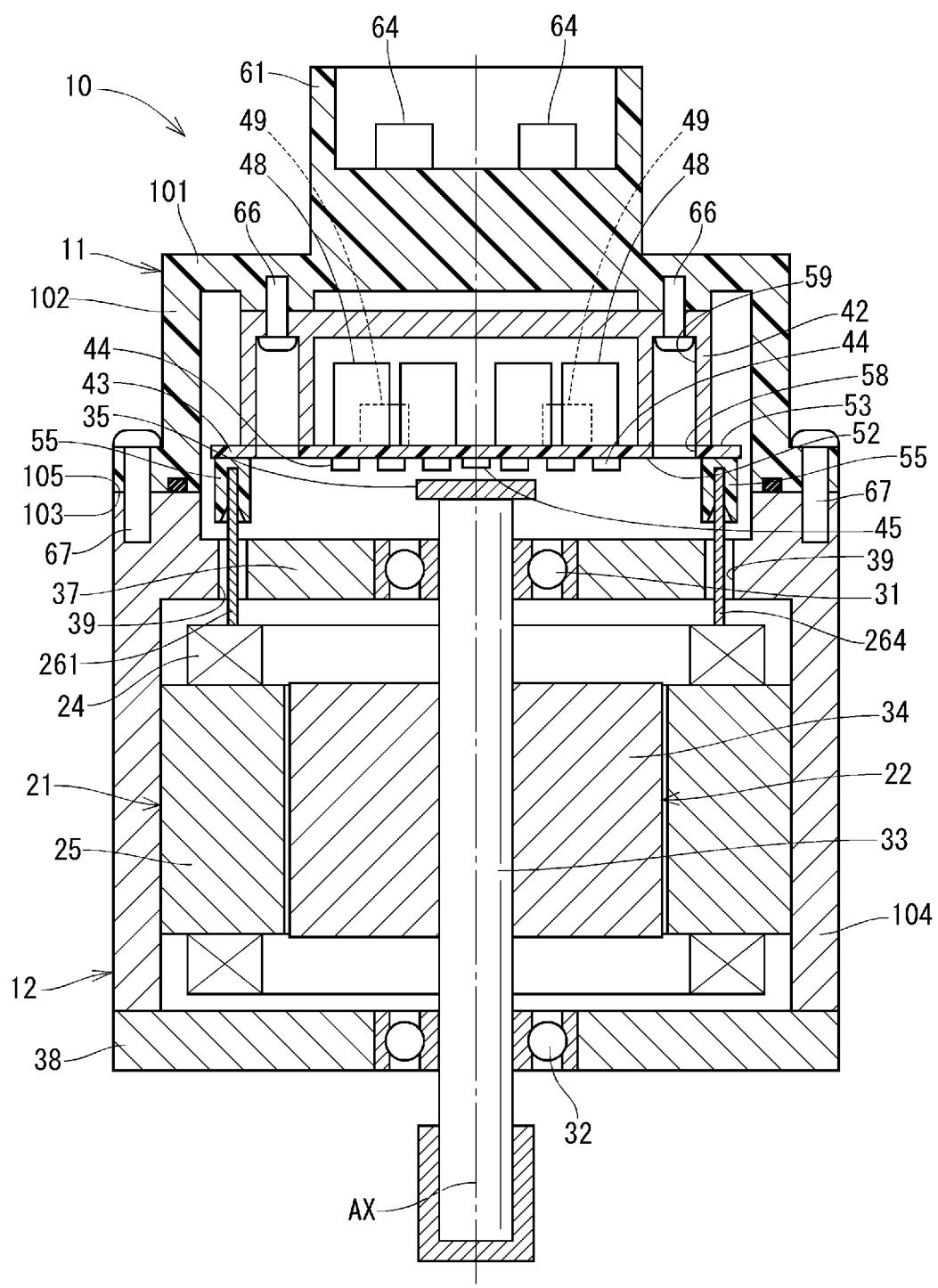
FIG. 12 is a sectional view of a drive apparatus according to the sixth embodiment.

FIG. 12 illustrates the drive apparatus 10 according to the sixth embodiment.

The drive apparatus 10 has the leads 26 (i.e., the first terminals) extending outside a surface of contact between the cover 101 and the housing 104 toward the control unit 11 in the axial direction. In other words, a connection of the motor 12 with the control unit 11, that is, joints of ends of the leads 26 with the connectors 55 lie closer to the control unit 11 than the contact surface 105 (i.e., an end surface) of the housing 104 which is attached to the end surface of the cover 101 does in the axial direction.

The connectors 55 (i.e., a joint of the control unit 11 with the motor 12) extend closer to the motor 12 than the contact surface 103 of the covering portion 102 of the cover 101 does. In other words, the connectors 55 extend outside the contact surface 103 toward the motor 12. The contact surface 103 is an end surface of the covering portion 102 which is attached to the housing 104 (i.e., the contact surface 105).

Figure 13:
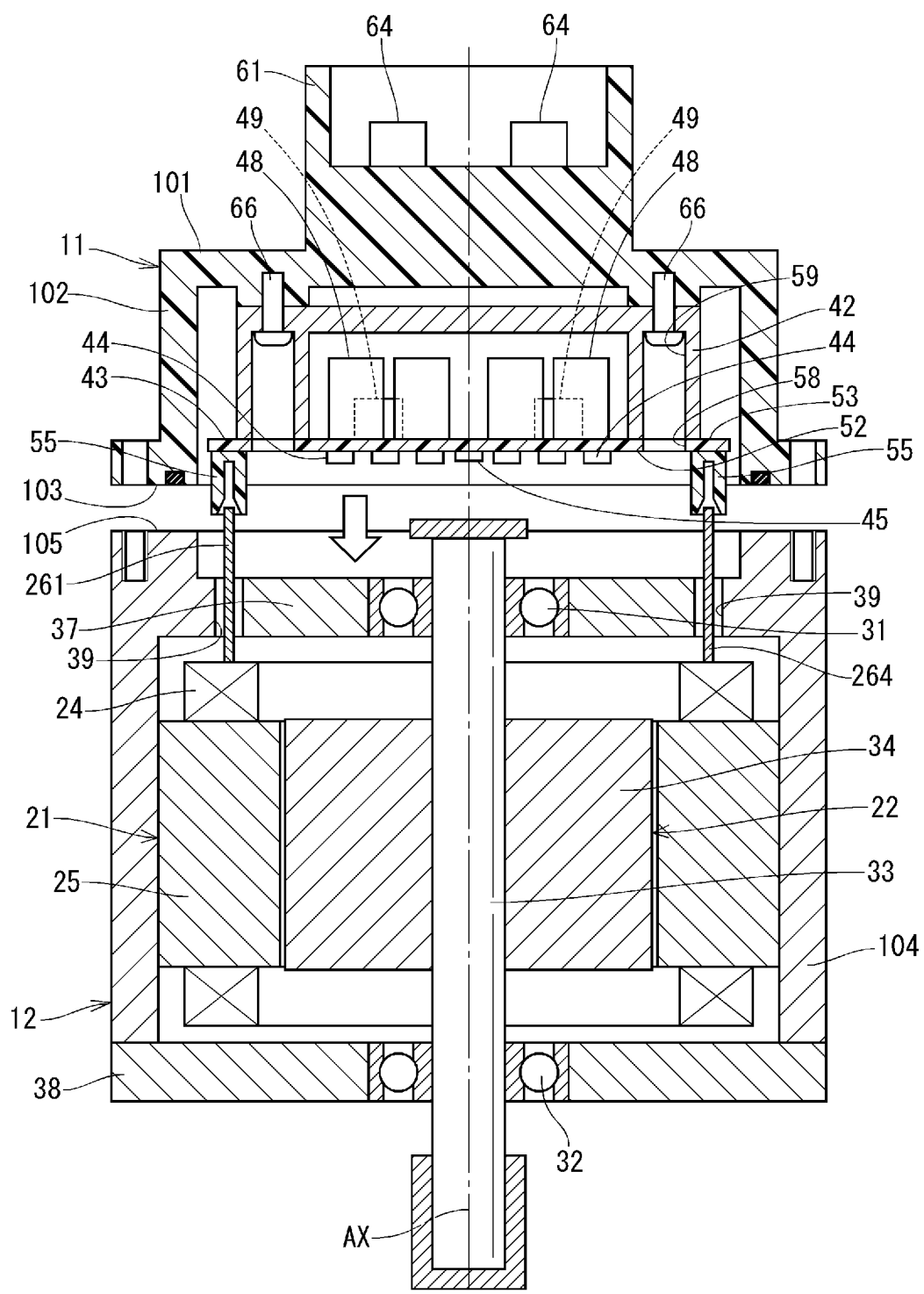
FIG. 13 is a sectional view which illustrates a fabrication process to join a motor and a control unit together when the drive apparatus of FIG. 12 is fabricated.

Therefore, in the fabrication process to join the motor 12 to the control unit 11, the leads 26, as clearly illustrated in FIG. 13, start to be inserted into the connectors 55 before the motor 12 and the control unit 11 contact with each other. This enables a fabrication operator to visually perceive the condition of insertion of the leads 26 into the connectors 55.

Seventh Embodiment

Figure 14:
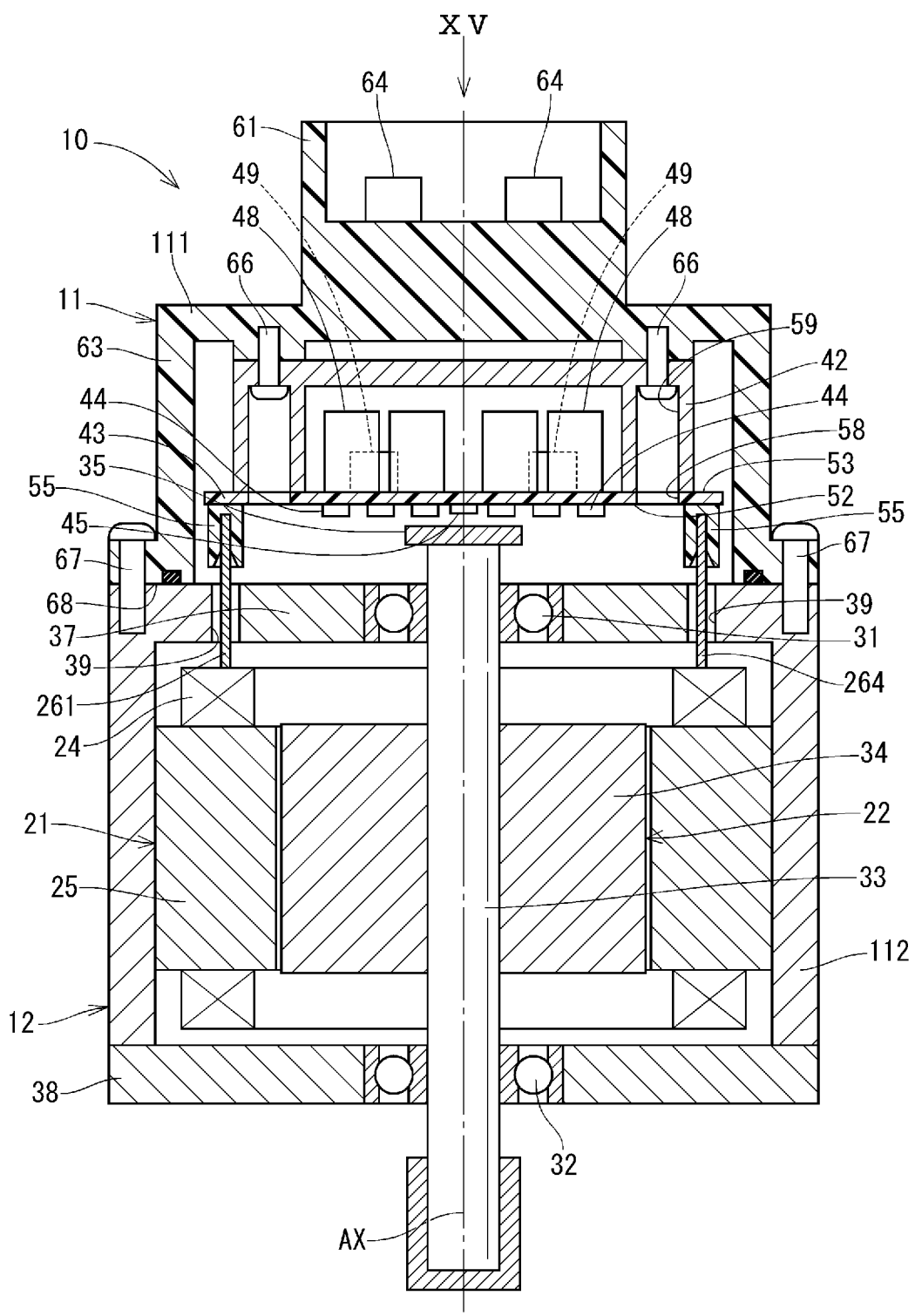
FIG. 14 is a sectional view of a drive apparatus according to the seventh embodiment.
Figure 15:
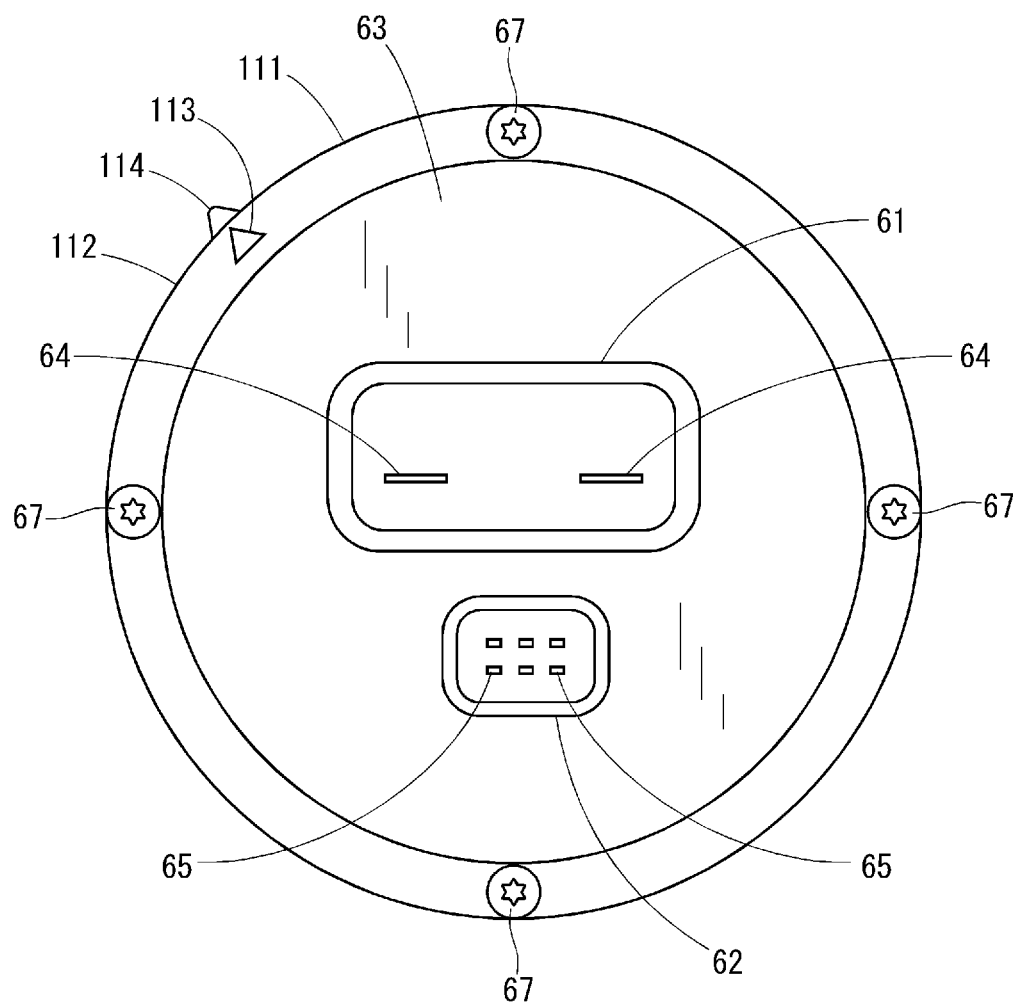
FIG. 15 is a view of the drive apparatus in FIG. 14, as viewed from an arrow XV in FIG. 14.

FIGS. 14 and 15 illustrate the drive apparatus 10 according to the seventh embodiment.

The drive apparatus 10 includes the cover 111 and the housing 112 which have marks 113 and 114, respectively, for use in positioning or orienting the cover 111 and the housing 112 in the circumferential direction thereof.

Specifically, positioning of the leads 26 relative to the connectors 55 in the circumferential direction of the drive apparatus 10 (i.e., the motor 12), that is, alignment of each of the leads 26 with a corresponding one of the connectors 55 in the axial direction of the drive apparatus 10 (i.e., the motor 12) is achieved by aligning the marks 113 and 114 in the axial direction.

MODIFICATIONS

The joint of the cover or the heat sink to the housing in the above embodiments may be achieved not only using screws, but also adhesive or press-fitting techniques.

The first terminals of the motor 12 may alternatively be made of female terminals, while the second terminals of the control unit 11 may alternatively be made of male terminals.

The first terminals of the motor 12 and the second terminals of the control unit 11 may include a plurality of connecting wires or conductors.

The substrate 43 may be designed to have electronic devices mounted only on one of the major surfaces thereof.

The housing of the motor 12 may be engineered to include the first frame end 37 which is made of a member discrete from the cylindrical case 36. The housing may alternatively be made up of the first frame end 37 and the second frame end 38 without use of the cylindrical case 36. The first frame end 37 and the second frame end 38 may be arranged to firmly retain the stator core 24 therebetween.

The motor 12 may be made of a single three-phase coil 25 or three or more three-phase coils 25.

The number of phases of the motor 12 is not limited to three.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. A drive apparatus for use in an electrical power steering system which electrically assists a steering operation of a driver of a vehicle, comprising:
 a motor which includes a housing, a stator secured to the housing, and a rotor which is rotatable relative to the stator; and a control unit which includes a cover, a heat sink secured to the cover, a control substrate secured to the heat sink, and an electronic device mounted on the control substrate and works to control energization of a coil of the stator, wherein the heat sink is secured to the cover by a fastener, and wherein the heat sink is directly secured to the control substrate on a substrate surface facing away from the motor, wherein the coil has a first terminal which extends toward the control unit through the housing, wherein the control substrate is equipped with a second terminal which is detachably connected to the first terminal, and wherein the second terminal has formed therein a cylindrical receptacle hole including a socket portion and a guide portion located closer to an opening of the cylindrical receptacle hole than the socket portion.

2. The drive apparatus as set forth in claim 1, wherein the first terminal is made of a male terminal, and the second terminal is made of a female terminal.

3. The drive apparatus as set forth in claim 1, wherein if a direction parallel to an axis of rotation of the motor is defined as an axial direction, a direction perpendicular to the axis of rotation of the motor is defined as a radial direction, and a direction around the axis of rotation of the motor is defined as a circumferential direction, the first terminal and the second terminal are joined together or removed from each other in the axial direction, wherein the cover or the heat sink has a fitting portion which engages a catching portion of the housing to position the second terminal relative to the first terminal in the radial and circumferential directions, and wherein a distance by which the fitting portion engages the catching portion in the axial direction is set longer than a distance by which the first terminal is inserted into the second terminal in the axial direction.

4. The drive apparatus as set forth in claim 1, wherein the second terminal has a guide which guides insertion of the first terminal into the second terminal.

5. The drive apparatus as set forth in claim 1, wherein the housing has a contact surface attached to the cover, the first terminal extending outside the contact surface of the housing toward the control unit, and wherein the cover has a contact surface attached to the housing, the second terminal extending outside the contact surface of the cover toward the motor.

6. The drive apparatus as set forth in claim 1, wherein if a direction around an axis of rotation of the motor is defined as a circumferential direction, the cover and the housing have marks which serve to position the cover and the housing in the circumferential direction.

7. The drive apparatus as set forth in claim 1, wherein the control unit is directly secured via a mechanical fastener to the housing only using one of the heat sink and the cover.

8. The drive apparatus as set forth in claim 1, wherein the guide portion has a frusto-conical shape and an inner diameter increasing toward an opening of the second terminal.

9. The drive apparatus as set forth in claim 1, wherein the control substrate, heatsink, and electronic device are disposed inside the cover.

10. The drive apparatus as set forth in claim 9, wherein the second terminal is disposed inside the cover.

11. The drive apparatus as set forth in claim 1, wherein the heat sink is exclusive of the motor housing.

12. The drive apparatus as set forth in claim 1, wherein the motor including the housing, the stator and the rotor is assembled as a first assembly, and the control unit including the cover, the heat sink, the control substrate and the electronic device is separately assembled as a second assembly.

13. The drive apparatus as set forth in claim 12, wherein the first assembly is connected to the second assembly as a final assembly.

14. The drive apparatus as set forth in claim 1, wherein the first terminal does not pass through the control substrate.

15. The drive apparatus as set forth in claim 1, wherein the second terminal comprises a single piece for the cylindrical receptacle hole including the socket portion and the guide portion having a frusto-conical shape.

16. The drive apparatus as set forth in claim 1, wherein the fastener includes a screw.

17. The drive apparatus as set forth in claim 1, wherein the heat sink is directly secured to the control substrate by a threaded fastener.

* * * * *